UNITED STATES PATENT OFFICE.

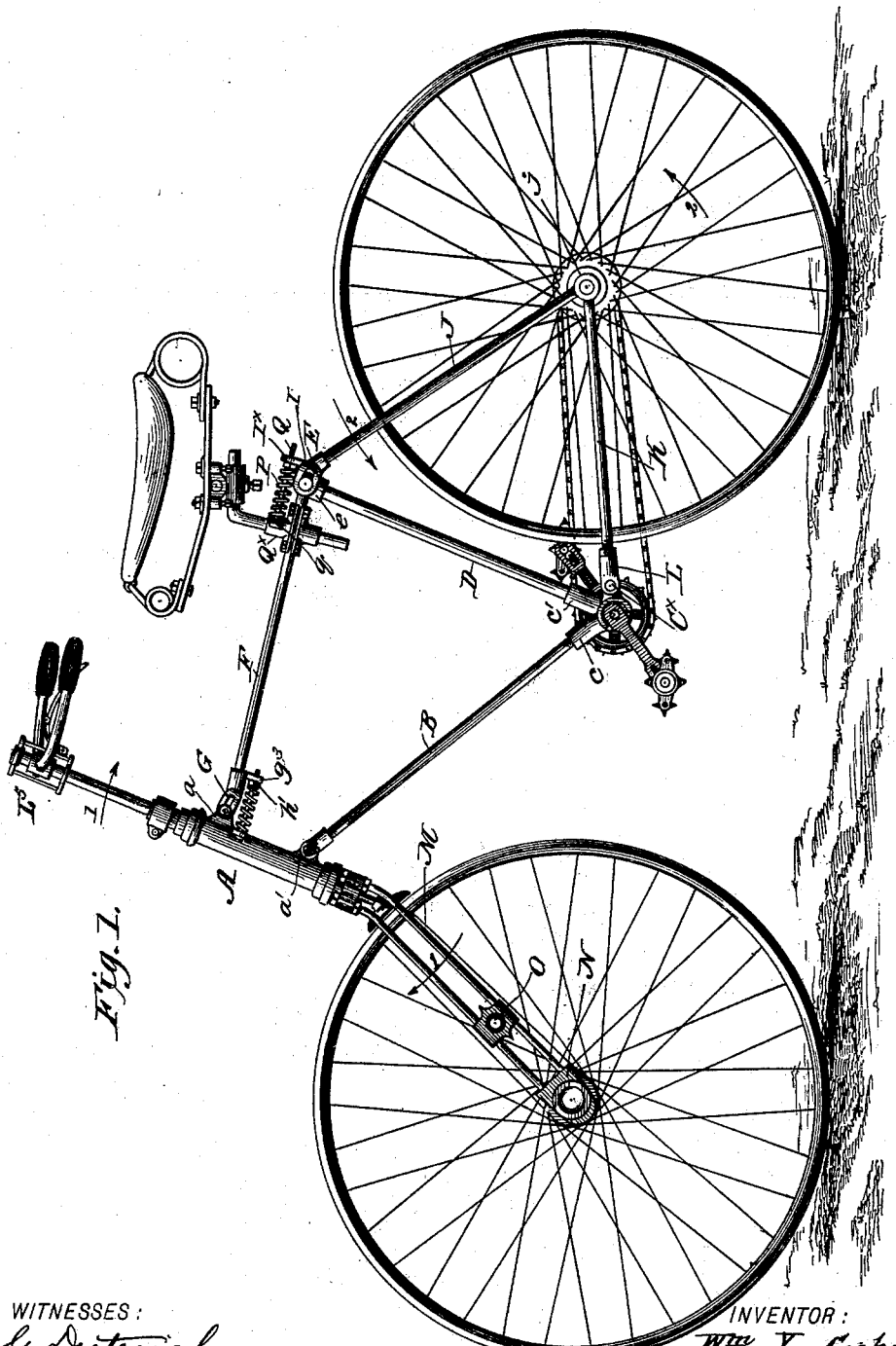

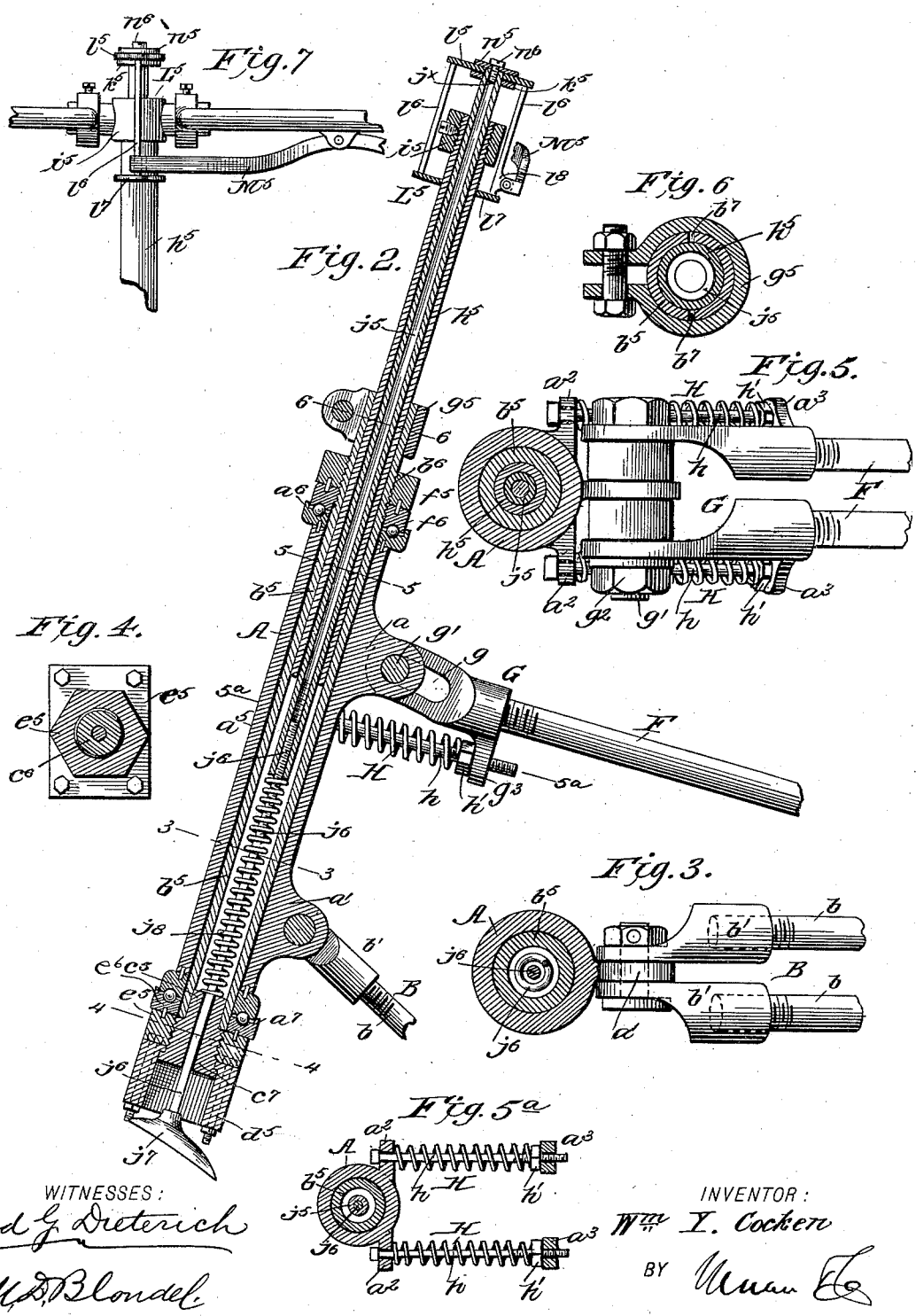

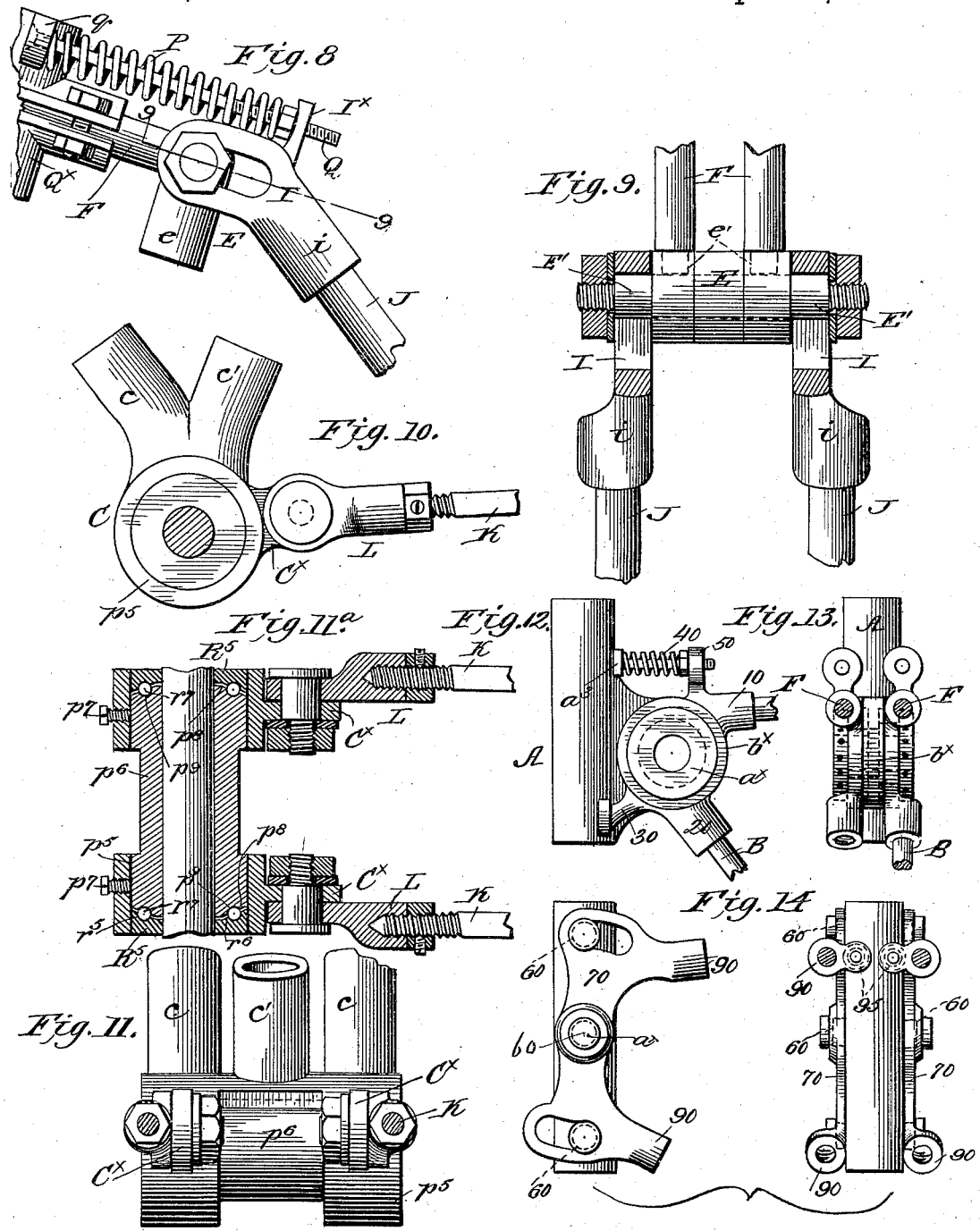

WILLIAM Y. COCKEN, OF TIFFIN, OHIO.

BICYCLE.

SPECIFICATION forming part of Letters Patent No. 505,753, dated September 26, 1893.

Application filed May 11, 1892. Serial No. 432,676. (No model.)

*To all whom it may concern:*

Be it known that I, WILLIAM Y. COCKEN, residing at Tiffin, in the county of Seneca and State of Ohio, have invented certain new and useful Improvements in Bicycles, of which the following is a specification.

My invention relates to improvements in the general construction and arrangement, of a safety bicycle, and it has for its object to provide a machine of this character in which the vibratory strain and the shock to which it is subjected in use, will be greatly reduced and taken up, whereby the durability of the machine and the comfort of the rider will be greatly increased.

My invention consists, primarily, in a main frame having its seat bar or backbone connected at its front end to the steering head, by means of a spring connection, and its rear end similarly connected with the rear wheel fork frame, such connections being so arranged that the weight of the rider will assist in carrying the wheels over an obstruction instead of retarding such movement as is the case when rigid frames are employed.

It also consists in combining with such peculiarly constructed main frame a suitably arranged brake mechanism, operating through the steering head, and suitably arranged movable bearings adapted to receive the propelling axle.

Finally my invention consists in certain details of mechanism, and novel combinations thereof, all of which will hereinafter be fully described in the specification and pointed out in the claims, reference being had to the accompanying drawings in which—

Figure 1 is a side elevation of a safety bicycle constructed in accordance with my invention. Fig. 2 is an enlarged vertical section of the steering head. Fig. 3 is a horizontal section thereof taken on line 3—3 Fig. 2. Fig. 4 is a similar view on the line 4—4 Fig. 2. Figs. 5 $5^a$ and 6 are horizontal sections on the lines 5—5 $5^a$ $5^a$ and 6—6 Fig. 2. Fig. 7 is a detail rear view of the handle bar socket and the upper end of the brake sleeve. Fig. 8 is a detail side view illustrating the seat bar and rear wheel fork connection. Fig. 9 is a section on line 9—9 Fig. 8. Figs. 10, 11 and $11^a$ are respectively a side view, rear view and horizontal section of the propeller axle bearing and Figs. 12, 13 and 14 are detail views of modifications of the connections between the steering head, the back bone and main brace, which will be hereinafter specially referred to.

In the practical construction of my improved machine, the steering head or tubular section A, is formed with rearwardly extending apertured lugs $a$, $a'$ the upper one $a$ of which has its aperture at a point a short distance to the rear of the lower one $a'$ for a purpose presently to be explained. To the lower lug $a'$ is pivotally connected the main brace B, formed of the two tubular rods $b$ $b$, the upper ends of which are screw tapped into the knuckle joints $b'$ $b'$, which are pivotally secured to such lug $a'$ in the manner most clearly shown in Fig. 3 of the drawings while the lower ends of such rods are threaded and fitted into the threaded sockets $c$ $c$ formed on the front upper edge of the crank axle bracket or support C. This bracket C has a central rearward and upwardly projecting screw socket $c'$ in which is screwed the lower end of the rearwardly inclined bar D, its upper end fitting in a screw tap in the lower extension $e$ of a union member E, the construction of which is most clearly shown in Figs. 8 and 9, by reference to which it will be seen, that such member is mounted on a bolt $E'$, and to each side thereof are collars $e'$ in the front face of which are screwed the rear ends of the double back bone or seat bars F F.

The seat bars F, F, have their front ends fitted in socket plates G, G, which plates are pivotally connected with the upper lug $a$ on the head A, as most clearly shown in Fig. 2; they having each a curved slot $g$ through which passes a bolt $g'$, which bolt also passes through the aperture in the lug $a$, and is held in position by the lock nut $g^2$. Normally the pivot bolt $g'$ sits in the front end of the slots $g$, of the plates G, it being held to such position by the coiled springs H, fitted about the guide bolts $h$, which are loosely fitted at their front end in lugs $a^2$ on the head A, their rear ends fitting loosely in apertured ears $g^3$ on the plates G. To provide for a proper tension of such springs an adjusting nut $h'$ is fitted on the bolts $h$ as shown.

The union bolt $E'$, has laterally projecting stub pivots upon which are fitted the slotted members I I, which are formed with downwardly and rearwardly extending threaded sockets $i$, in which are secured the upper ends of the rear fork rods J J, the lower ends of which are connected to the rear axle bearing $j$, to which are also connected the rear ends of the horizontally disposed rods K, which have their front ends connected to knuckle joints L, which in turn are pivotally connected with an apertured ear $C^x$ projected rearwardly from the crank axle bearing, such pivotal connection being at a point slightly above the center of the crank axle bearing as shown for a purpose hereinafter described.

The front fork is composed of the double rod members M secured at their upper ends in any desired manner to the steering head, preferably however in the manner shown most clearly in Figs. 2 and 4, and such rods are curved forward and connected at their lower ends to the front axle bearing block N.

O O indicate the foot rests which are adjustably held on each pair of rods M. It will be observed by reference to Fig. 1 that the steering head which is supported on the front wheel is pivotally connected with the rear frame, by the pin which connects the lower lug $a'$ and the main brace bar B, and by connecting such main brace, the crank axle bearing the rear frame, and the back bone frame, in the manner shown and described, the entire frame becomes approximately a rigid frame so far as its relation to the steering head is concerned, such head and the front fork frame, becoming as it were the movable frame.

The curved slots $g$ in the plates G, are in an arc struck from the fulcrum point of the steering head, and the normal pivotal point of the plates G, is slightly to the rear of such fulcrum point. By this arrangement it will be readily understood that, while the entire frame will maintain a yielding condition under ordinary circumstances so soon as the front wheel meets with an obstruction, and is thereby slightly elevated, the upper part of the steering head will be swung rearward (see arrow 1) to a proportionate degree, and as it is thus swung rearward the pivotal bearing bolt $g'$ will be thereby moved farther rearward from the fulcrum point, and as it is thus forced rearward the weight of the rider will overcome the resistance of the springs H and serve to still farther pull the upper portion of the steering head rearward, and thereby proportionately throw the front fork frame with the wheel upward and forward, and materially assist the front wheel to climb over the obstruction.

I am aware that yielding front frames are broadly not new, but so far as I know such frames and their resistance springs have been so arranged and constructed that the front wheel will be thrown rearward, as it engages an obstruction. This movement, it should be stated, imparts an unpleasant shock to the rider, and is one I seek to overcome, by providing means whereby the front wheel will be thrown forward instead of rearward as it engages an obstruction.

By my construction of frame, the peculiar connection of the head with such frame and the spring appliances, the vibration and shock incident to such machines is not only overcome, but the wheel is lifted over the obstruction, the weight of the rider materially assisting in such operation, instead of acting as a dead weight, for the front wheel to lift in passing over the obstruction. The rear forked frame is also adapted for an independent movement relatively to the main brace B, the front bar D and the back bone, owing to its peculiar connection with such parts, it being fulcrumed at $C^x$ to the crank axle bearing. The slots in the members I are on an arc struck from the fulcrum $C^x$, and such members are held, so that the bearing points are at the forward ends of the slots, such position being normally maintained by the springs P fitted on the rods Q secured to ears $q$ on the seat clamp $Q^x$, and projected rearwardly through the apertured ears $I^x$ on the links I, such rods being also provided with adjusting nuts whereby the tension of the springs can be set to accommodate a light or heavy rider.

By arranging the rear wheel frame as stated it will have a yielding support, which allows of an easy rise of such wheel over obstructions, in that the entire rear forked frame, will, owing to the impact of the wheel against the obstruction, be thereby swung upward in the direction indicated by the arrow 2 in Fig. 1 which movement causes the link bearings I to move forward, the weight of the rider in this instance also materially assisting such movement.

By placing the fulcrum of the rear frame to the rear and above the crank axle center the limited movement of such frame will not interfere with the tension or set of the drive chain. While I prefer to connect the steering head to the back bone and main brace in the manner before described, I do not desire to limit myself to such construction as this may be varied without departing from the broad idea of my invention. For instance the head A may have but a single lug $a^x$ to which knuckle plates $b^x$ are pivotally connected, as clearly shown in Figs. 12 and 13, and such plates formed with internally threaded sockets 10—20 into which the back bone rods and the main brace rods are secured; and with stop lugs 30 on their under faces which are held to bear against the head A by the springs 40, interposed between the lugs $a^3$ and the lugs 50 on the plates $b^x$. Or if desired, the head A may have three lugs 60 projected from each side, the central one of which forms the fulcrum for a rocker plate 70, the opposite ends of which have curved slots fitting over the other two lugs 60—60, and with rearwardly extending sockets 90, 90 which receive the back bone and main brace bars, such rocker plates being also held to their normal position by the springs 95 see Fig. 14.

The steering head A, the construction of which is most clearly shown in Fig. 2, consists of the fixed tubular section $a^5$, provided at its upper and lower end with the usual ball bearing socket plates $a^6$ $a^7$, the rotatable tubular section $b^5$ fitted in the section $a^5$, its upper and lower edges projected beyond such section $a^5$, the lower extension being secured on a hub $c^5$ projected up from a centrally apertured plug $c^7$, which bears against the under face of the bed plate $d^5$ to which the front fork arms M are secured. The plug $c^7$ has an externally threaded portion upon which is fitted the lower lock nut $e^5$, which has fixedly connected therewith the movable ball bearing section $e^6$. The upper projected end of the section $b^5$ has an externally threaded portion $b^6$ upon which is fitted the upper lock nut $f^5$ which has fixedly secured thereto the upper ball bearing socket plate $f^6$; and the extreme upper end of such section $b^5$ is split as at $b^7$ around which is fitted a clamp ring $g^5$, as shown. $h^5$ indicates the adjustable vertical handle bar, which is tubular and fits in the upper end of the section $b^5$, it being held to any of its adjusted positions by the clamp ring $g^5$, which when clamped presses the upper end of the section $b^5$ into a tight frictional contact with the tubular bar $h^5$, and upon the upper end of this bar, which is threaded as usual, is fitted the socket piece $i^5$ into which the inner ends of the handle arms are fitted in the usual manner. Vertically movable within the section $h^5$ is a brake sleeve $j^5$ into the lower end of which is screwed the brake rod proper $j^6$, which passes down through the screw plug $c^6$ and carries the brake spoon $j^7$. $j^8$ indicates a coiled brake spring which is disposed about the rod $j^6$, and bears against the tubular sleeve $j^5$ and the plug $c^7$ at its upper and lower ends respectively. By connecting the rod $j^6$ with the brake sleeve $j^5$ in the manner shown provision is made for lengthening or shortening the brake rod when it is desired to adjust the vertical handle bar. Shrunk or otherwise secured upon the upper end of the sleeve $j^5$ is a washer $k^5$ upon which rests the cross plate $l^5$ which is connected by the rods $l^6$ to a lower cross plate $l^7$ held for vertical movement and guided on the section $h^5$, and one of such bars $l^6$ has an apertured ear $l^8$ to which the inner end of the brake lever $M^5$ is secured (see Figs. 2 and 7).

$n^5$ indicates a clamp washer which is fitted over the upper end of the sleeve $j^5$ and clamps the upper cross plate $l^5$ to the sleeve $j^5$ such washer being securely held by the screw $n^6$ which engages the internally threaded end $j^×$ of the sleeve as shown.

From the foregoing taken in connection with Fig. 2 of the drawings it will be readily seen that the coiled spring ($j^8$) serves to normally hold the brake rod and sleeve to its upper position, and when the brake handle is operated in the ordinary manner, the guide frame $L^5$ will be forced downward, moving with it the sleeve $j^5$ and brake rod $j^6$ to apply the brake. The crank axle bearing previously referred to and which is most clearly shown in Figs 10 and 11 consists of a main bearing block, formed with two depending apertured sockets $p^5$ $p^5$ in which sits the centrally apertured bearing hub $p^6$, which is held from turning by means of set screws $p^7$ $p^7$. The outer faces of the hub $p^6$ are beveled inward as at $p^8$, and in such beveled portions, are the annular ball cavities $p^9$.

$R^5$ indicates the bearing plates which are fitted upon the axle to turn therewith and which have outwardly beveled internal faces $r^6$ formed with internal annular ball sockets $r^5$ which sit against the balls $r^7$ as clearly shown, the usual washer plates and nuts being employed in practice to hold the several parts together.

By arranging the bearing hub as shown it will be readily seen that when the bearing is worn it can be quickly removed and another inserted without the necessity of sending the machine to the factory or repair shop.

Having thus described my invention, what I claim, and desire to secure by Letters Patent, is—

1. A bicycle, comprising a main frame, the rear wheel supported thereon, the steering head, said head carrying the front wheel, said head having a pivotal connection with the main frame, and held from forward movement above its pivotal connection, but adapted for rearward movement above such point, whereby the front wheel will be thrown forward, when meeting an obstruction substantially as and for the purpose described.

2. In a safety bicycle, the combination of the main frame, carrying the crank axle and rear wheel, the steering head carrying the front wheel, said head pivotally connected to the main frame, and held from a forward swing above its pivot, such upper end adapted to swing rearward when the front wheel meets an obstruction, and tension devices for holding said steering head to its outer or normal position substantially as and for the purpose described.

3. In a safety bicycle the combination with the front wheel, the steering head, the seat bars F, diagonal bars B and D and the crank axle bearing, constructed substantially as shown, of the rearwardly extending bar K pivoted at its front end to the axle bearing, the forwardly inclined bar J joined at its lower end to the outer end of the bar K, such joint forming a fixed bearing for the rear wheel, the upper end of such bar J having a sliding pivotal connection with the upper end of the bar D, and rear ends of the bars F F, and the spring P, all arranged substantially as and for the purposes described.

4. In a safety bicycle, in combination, the rear wheel, the bars J, K, and D forming the rear wheel supporting frame, the upwardly inclined brace bars B, the steering head, the back bone or seat bars F, having slotted plates G at their front end, operating on a connecting pin, held on the steering head, said head pivotally connected to the bars B at a point below and in advance of the slot and pin connection, and means for holding the head to its forward position substantially as shown and described.

5. In a safety bicycle, in combination with the steering head, the crank axle bearing, the bars D, and B rigidly connected at one end to such bearing, the opposite end of bar B being connected with the steering head, the back bone bar F, connected at the front end of the steering head, the union bolt E mounted on the upper end of the bar D, said bolt having a socket to receive the back bone bar F, and lateral stud portions $e$, and the springs P the slotted members I secured to the upper end of the bar J, and movable on the studs $e$ all substantially as and for the purposes described.

6. In a safety bicycle, a crank axle bearing, consisting of a tubular sleeve, socket members forming bearings therefor, said sockets projected over the ends of the sleeve, the said sleeve ends being beveled and formed with annular ball receiving grooves, cap plates having inner beveled faces formed with annular grooves, and means for holding the sleeve in the sockets, all substantially as shown and described.

7. In a bicycle, the combination, with the wheel supporting frames, of the non rotatable tubular steering head section $a^5$, the tubular section $b^5$ rotatable in such section $a^5$, the apertured bed plate, connecting the lower end of such section $b^5$ with the front wheel frame, the tubular section $h^5$ fitted in the upper end of the section $b^5$ and held to turn therewith, the handle bars secured to the upper end of such section $h^5$, the vertically movable brake rod operating in the section $h^5$ and $b^5$ and the bed plate, and the frame $L^5$ secured to the upper end of the brake rod and the brake lever, connected to such frame, all arranged substantially as shown and for the purposes described.

WILLIAM Y. COCKEN.

Witnesses:
WARREN F. NOBLE,
SIMON A. LEISTER.